United States Patent
Retzbach et al.

(10) Patent No.: US 6,179,530 B1
(45) Date of Patent: Jan. 30, 2001

(54) EXPANSION CLAMPING CHUCK

(75) Inventors: Thomas Retzbach, Bönnigheim; Joachim Müller, Obersulm, both of (DE)

(73) Assignee: Schunk GmbH & Co. KG Fabrik für Spann - und Greifwerkzeuge (DE)

( * ) Notice: Under 35 U.S.C. 154(b), the term of this patent shall be extended for 0 days.

(21) Appl. No.: 09/242,661

(22) PCT Filed: Aug. 22, 1997

(86) PCT No.: PCT/EP97/04588

§ 371 Date: Feb. 22, 1999

§ 102(e) Date: Feb. 22, 1999

(87) PCT Pub. No.: WO98/07538

PCT Pub. Date: Feb. 26, 1998

(30) Foreign Application Priority Data

Aug. 23, 1996 (DE) .......................... 296 14 727 U

(51) Int. Cl.$^7$ .................... B23B 31/30; B23B 31/40
(52) U.S. Cl. ...................... 408/239 R; 279/2.08; 279/4.03
(58) Field of Search ................... 279/2.06, 2.08, 279/4.03, 4.05, 4.06, 127; 408/238, 239 R

(56) References Cited

U.S. PATENT DOCUMENTS

| | | | |
|---|---|---|---|
| 3,830,509 | * | 8/1974 | Weber ................... 279/2.08 |
| 5,141,370 | * | 8/1992 | Baumann ............... 408/239 R |
| 5,265,988 | | 11/1993 | Schmigalla et al. .......... 408/225 |
| 5,516,243 | * | 5/1996 | Laube ..................... 279/2.08 |
| 6,077,003 | * | 6/2000 | Laube ..................... 279/2.08 |

FOREIGN PATENT DOCUMENTS

| | | | |
|---|---|---|---|
| 743530 | | 12/1943 | (DE). |
| 1552257 | | 12/1969 | (DE). |
| 1934930 | | 1/1970 | (DE). |
| 2700934 | | 7/1978 | (DE). |
| 3721521 | * | 1/1989 | (DE) ................. 279/4.03 |
| 3913626 | * | 10/1990 | (DE) ................. 279/4.03 |
| 4015149 | | 11/1991 | (DE). |
| 9411260 | | 12/1994 | (DE). |
| 4331453 | | 3/1995 | (DE). |
| 4331462 | | 3/1995 | (DE). |
| 4418571 | | 11/1995 | (DE). |
| 4421002 | | 12/1995 | (DE). |
| 19548366 | | 7/1996 | (DE). |
| 2112677 | | 7/1983 | (GB). |
| 321103 | * | 12/1989 | (JP) ................. 279/4.03 |
| WO 93/18880 | | 3/1992 | (WO). |

* cited by examiner

*Primary Examiner*—Daniel W. Howell
(74) *Attorney, Agent, or Firm*—Baker & Maxham

(57) ABSTRACT

An expansion chuck for simultaneously chucking a tool shaft and a hollow tool part such as a beveling bush. A solid chuck body which can be chucked in the working spindle of a machine tool has in its chucking part a central receptacle bore to receive the tool shaft to be chucked as well as an external chucking face to mount the hollow tool part. An elongated toroidal chamber is arranged coaxially with the receptacle bore and the outside chucking face in the interior of the chucking part of the chuck body and is filled with an incompressible medium. Due to a hydraulic internal pressure in the toroidal chamber, both of its peripheral walls undergo elastic deformation, radially inwardly to chuck the tool shaft, and radially outwardly to chuck the hollow tool part.

12 Claims, 2 Drawing Sheets

EXPANSION CLAMPING CHUCK

BACKGROUND OF THE INVENTION

1. Field of Invention

This invention generally concerns an expansion chuck for the working spindle of a machine tool, and more particularly such a chuck having a rigid chuck body with a central receptacle bore for the shaft to be chucked, an elongated toroidal chamber which is coaxial with the receptacle bore in the one-piece chuck body and is filled with an incompressible fluid, as well as a device for generating a hydraulic pressure in said toroidal chamber.

2. Discussion of Related Art

Expansion chucks of the type of interest here are known in various embodiments and are mostly used for accurately centered chucking of a tool shaft such as the shaft of a drill or a milling cutter to secure these tools in the working spindle of a corresponding machine tool. With these types of hydraulic expansion chucks, which are known from German Utility Model 9,411,260, or from unexamined German Patent 2,700,934, for example, the toroidal chamber formed in the body of the chuck is bordered on the inside radially by a so-called expansion sleeve which undergoes elastic deformation radially toward the inside when hydraulic pressure is applied in this toroidal chamber, thereby securely gripping on all sides the tool shaft inserted into the receptacle bore.

A Tendo brochure from Fritz Schunk GmbH describes a hydraulic expansion chuck for tool sharpening and grinding machines, where the toroidal chamber filled with the incompressible liquid is deformed in the cylindrical chucking part of the chuck body, where the radial inside wall of this toroidal chamber has a relatively small wall thickness and undergoes deformation radially toward the inside under the hydraulic pressure in the toroidal chamber to chuck the tool shaft. After the central receptacle bore for the tool shaft there is a threaded bolt in a cross hole having a polygonal opening on its end which is accessible from the outside for insertion of a tool and having an outside thread in this enlarged end head which engages with an inside thread worked into part of this cross hole. At the other end of the shaft of this bolt, there is a piston which is moved back and forth by a screw action of the bolt in a cylindrical space with a sealing effect. This cylindrical space communicates with the toroidal chamber through an axially parallel channel in the body part of the chuck. By turning the bolt using a tool inserted from the outside, the internal pressure in the toroidal chamber necessary for the chucking operation and for the elastic deformation of the inside wall is created by means of the corresponding piston displacement in the cylinder filled with incompressible liquid. However, this expansion chuck as well as others that are already known were designed only for chucking a one-piece part such as the shaft of a tool.

On the other hand, so-called expansion mandrels for centrally securing hollow cylindrical work pieces for lathing, for example, are already known, where a narrow toroidal chamber which determines the respective chucking range is formed in a corresponding recess in the body of the mandrel which is limited toward the outside radially by an expansion sleeve. This external expansion sleeve is expanded radially outward, thus chucking the work piece placed previously on the mandrel, due to the buildup of an internal hydraulic pressure in this toroidal chamber filled with incompressible liquid.

German Patent 743,530 describes a chucking device for machine tools having a double-walled chucking sleeve for securing a hollow cylindrical tool on a shaft. The chucking sleeve is designed with a double wall and is securely attached to one end with a toroidal rotating body which accommodates a device for producing a hydraulic pressure in the elongated toroidal chamber of the chucking sleeve. Due to this hydraulic pressure in the toroidal chamber, the two peripheral walls of the double-walled chucking sleeve undergo elastic deformation with a radial inward and radial outward force, and are brought into pressure contact with the outside surface of the shaft and with the inside surface of the hollow cylindrical tool. Simultaneous chucking of two tools is neither provided here nor is it readily feasible.

International patent publication WO 93/18880 describes a hydraulic work holding bushing for chucking lathe tools in the tool receptacles of a revolver head having a thin-walled hollow cylindrical chucking part and a ring body connected to it. An elongated toroidal chamber communicates with a device arranged in the ring body to generate an internal hydraulic pressure. The two peripheral walls of the toroidal chamber are thin and undergo elastic deformation due to the hydraulic pressure in the toroidal chamber, so they are brought into pressure contact with the outside wall of the lathe tool and against the inside wall of the tool receptacle.

Finally, it is known from German Patent 1,552,257 and German Utility Model 9,411,260 that the shaft of a tool can be chucked in an expansion sleeve positioned separately in the chuck and additionally secured by teeth or by claw engagement, for example, to prevent twisting.

SUMMARY OF THE INVENTION

The object of the present invention is to create an expansion chuck that can be secured in the working spindle of a machine tool which permits not only chucking of a tool shaft but also centered chucking of a hollow cylindrical part, especially a beveling bushing, in a simple and accurate manner.

This invention makes it possible for the first time in a technically simple and inexpensive manner not only to chuck a solid cylindrical part such as the shaft of a tool, but also to additionally chuck a hollow cylindrical part such as another tool, a measurement gauge holder or the like, with high strength and accurate centering in a predetermined axial position on the longitudinal axis. Since the hydraulic pressure generated in the interior of the toroidal chamber also acts radially inwardly as well as radially outwardly, an elastic deformation of the bordering wall of the toroidal chamber radially on the inside and radially on the outside occurs simultaneously, using a single internal pressure generating operation, so that two separate parts can be chucked simultaneously without requiring any additional measures. When using two separate tools such as a shaft drill and a ring-shaped or socket-shaped beveling tool, a hole can be drilled in a work piece and a bevel can be cut at the entrance of the bore hole in a single operation. When using a socket-shaped tool with a suitable cutting geometry on the end face, so-called differential bore holes can also be produced in a single operation. In order to be able to transmit even a high torque to the additional tool without interference, another aspect of the present invention is characterized in that the hollow cylindrical part or the socket-shaped part of the additional tool is secured in a form-fitting manner to prevent it from twisting on the body of the chuck. A technically simple and inexpensive method of rotational fixation consists, for example, of a projection shaped on a rear edge of the socket-shaped part or a strap which is fitted into a suitably shaped axial groove in the chuck body so that it is longitudinally displaceable and allows axial adjustment of the socket-shaped part or the beveling bushing. To accurately set the length of the additional tool which is chucked from the outside and optionally make a mutual adjustment of the two tool positions, the axial operating position of the additional tool on the chuck body can be adjusted with a high degree of precision according to another aspect of this invention. Spacer bushings have proven to be especially suitable as adjusting means, which are screwed onto the rear end section of the socket-shaped part of the additional tool before the latter is chucked and are supported with their end edge on a ring stop on the chuck body.

To have a controlled influence on the chucking forces directed radially outwardly and radially inwardly, the thickness of the inside wall and the outside wall of the toroidal chamber is varied over their length according to another aspect of the present invention, which is accomplished in practical terms by means of a slightly conical arrangement of the toroidal chamber in the chuck body or through a curve-shaped or stepped course of the toroidal chamber in the longitudinal direction.

According to an additional aspect of the present invention, the outside wall of the chucking part of the chuck body may have elongated areas of a reduced wall thickness in alternation with thicker wall areas distributed uniformly over the circumference. The thinner wall areas may be longitudinal grooves and they cause the thicker wall areas to be pressed with a greater chucking force against the cylindrical inside surface of the sleeve. It is also possible to design the outside wall of the chucking part of the chuck body and the inside wall of the sleeve of the additional tool as having a polygonal profile, for example, a hexagonal cross section, thus resulting in an additional stable twist locking effect of the two parts during and after the chucking operation.

If an additional form-fitting connection of the sleeve on a chuck or a chucking mandrel by means of a screw thread is desired, a twist locking means may be achieved by widening the area of the thread by hydraulic means, so that the threads of the two parts are pressed together under a high force, thereby eliminating the play necessary for the screwing operation.

BRIEF DESCRIPTION OF THE DRAWING

The objects, advantages and features of this invention will be more readily apparent from the following description, when read in conjunction with the accompanying drawing, wherein.

DETAILED DESCRIPTION OF THE PREFERRED EMBODIMENTS

Figure 1:
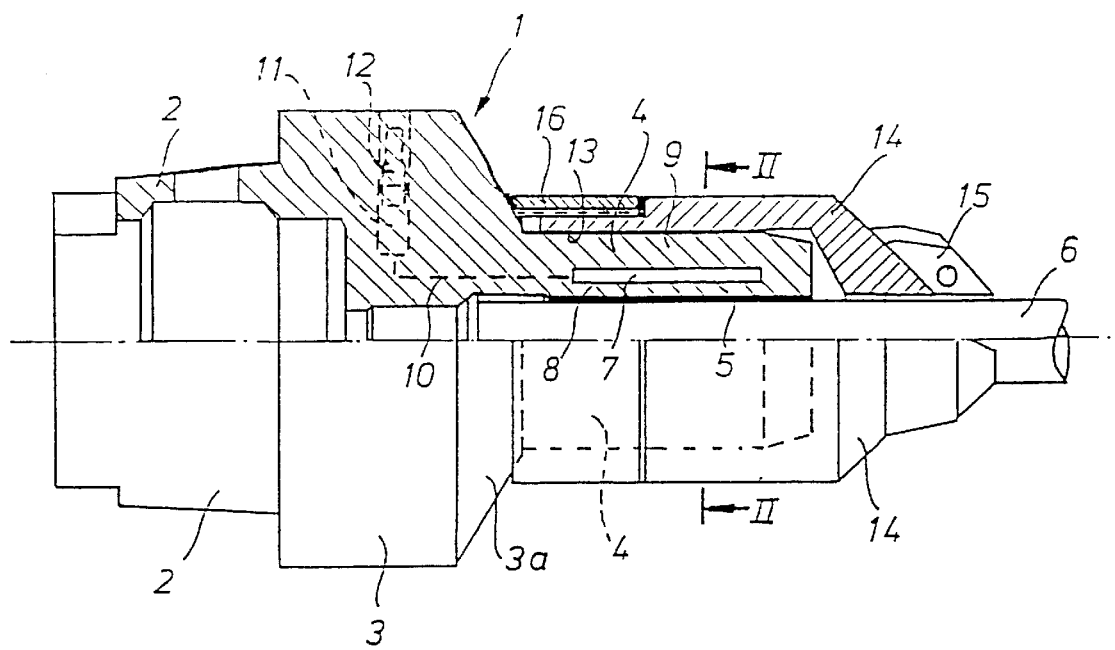
FIG. 1 is a partial sectional side view of an expansion chuck with the shaft chucked in it and with a hollow cylindrical beveling tool chucked in it in a partially cut away side view, in accordance with the invention.

As FIG. 1 shows, the expansion chuck consists of a chuck body 1 which is chucked in a known manner in the receptacle device (not shown) of a rotationally driven working spindle of a machine tool with its left end part 2 in the form of a truncated cone. A hollow cylindrical chucking part 4, which is shown with hatching in the upper part of FIG. 1 and with dotted lines in the lower part of the figure, is connected by a conical section to central part 3 with a larger diameter of preferably solid chucking body 1 which is designed in one piece. Furthermore, central receptacle bore 5 into which cylindrical shaft 6 here, for example, the shaft of a drilling tool, is inserted in chuck body 1.

Narrow toroidal chamber 7 is provided inside chucking part 4 of chuck body 1 so that it is axially centered and is coaxial with receptacle bore 5, whose length corresponds approximately to the required chucking range. Toroidal chamber 7, which is closed at one end, is bordered on the inside radially by inside wall 8 and on the outside radially by outside wall 9, both of which are parts of chuck body 1. The wall thickness of outside wall 9 is approximately 1.5 to 3 times greater than the wall thickness of inside wall 8. Toroidal chamber 7 communicates with cylindrical space 11 by way of channel 10 (shown with dotted lines here) in chuck body 1, the cylindrical space being bordered by control element 12 at one end consisting in a known way of a piston, a shaft and an outside threaded section into which a lathe tool can be inserted. Cylinder 11, channel 10 and toroidal chamber 7 are completely filled with a generally incompressible liquid. Peripheral surface 13 of outside wall 9 of chucking part 4, like the inside peripheral surface of inside wall 8, is designed as a precision machined cylindrical chucking face. A bushing-shaped additional tool 14 has been pushed onto peripheral face 13 of outside wall 9 and it has cutting plate 15 on its wedge-shaped right end section, which in the present case is a beveling tool for beveling the bore hole end produced with the drill. By means of adjusting ring 16, the axial position of beveling tool 14 with respect to the drill tip or chucking part 4 of chuck body 1 can be adjusted. Adjusting ring 16 is screwed onto the end section of bushing-shaped additional tool 14 by means of an inside thread and is supported on the conical section of chuck body 1 as shown here. By twisting adjusting ring 16 the precise axial position of additional tool 14, 15 with respect to the position or length of the main tool is adjusted before the chucking operation.

For simultaneous chucking of tool shaft 6 in receptacle bore 5 plus additional tool 14 on outside chucking surface 13 of chucking part 4, a high pressure is exerted on the liquid contained in cylinder 11 by screwing in control element 12 into the threaded bore (by means of its piston), and this pressure is transmitted via channel 10 into toroidal chamber 7. This hydraulic pressure causes an elastic bulging of inside wall 8 until it comes into pressure contact with the outside of shaft 6 while at the same time there is a radial bulging of outside wall 9 until it comes into pressure contact with the inside wall of socket-shaped beveling tool 14. Thus two separate parts, namely tool shaft 6 and also the socket-shaped or bushing-shaped part of additional tool 14 are chucked at the same time by a single operation of control element 12, thereby achieving the precise centering of two tools 6 and 14 which is characteristic of the expansion chuck principle.

Figure 2:
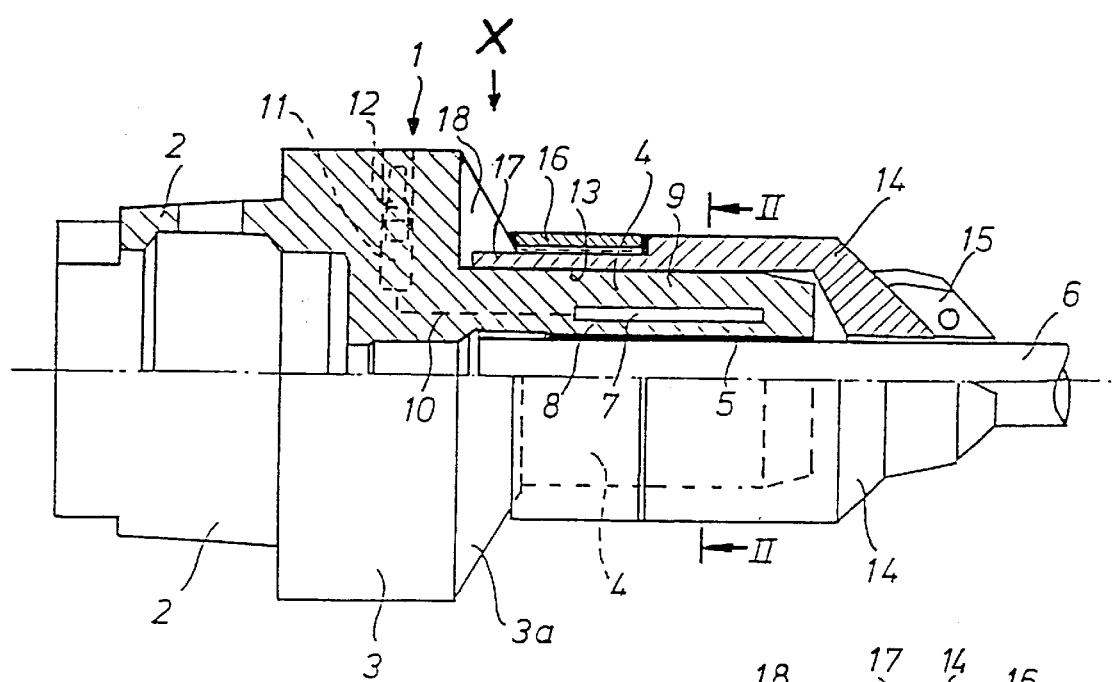
FIG. 2 is a partial sectional side view of another expansion chuck in accordance with the invention, with a twist locking means on the beveling tool.
Figure 2A:
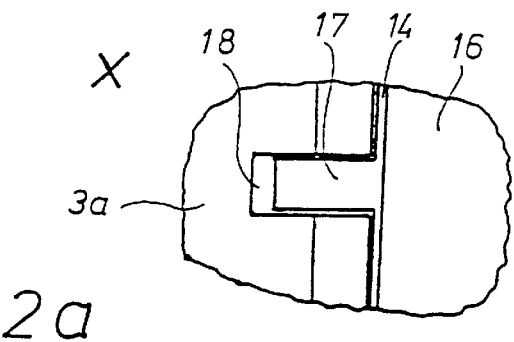
FIG. 2a is a partial top view of the twist locking means, taken from position X in FIG. 2.

The embodiment according to FIG. 2 corresponds largely to the embodiment according to FIG. 1 as described above, with the same parts being labeled with the same reference numerals. If greater torques are to be transmitted from the chuck to additional tool 14 and if outside wall 9 has a greater wall thickness, an additional form-fitting twist locking means is provided to suppress any additional slippage between chuck body 1 and additional tool 14 which is under stress in chucking. This additional twist locking means may be provided in various ways through appropriate shaping of the components such as cotter and keyway joints, and non-round cross sections, among others. With the embodiment diagrammed in FIG. 2, axial projection or tab 17 is molded onto the socket-shaped part of additional tool 14, engaging in cutout 18 in conical transitional section 3a of chuck body 1 in disk seating. The width of dimensionally stable tab 17 corresponds approximately to the width of cutout 18 and its length is smaller than the length of the cutout to prevent collisions in the axial adjustment of additional tool 14.

Figure 4:
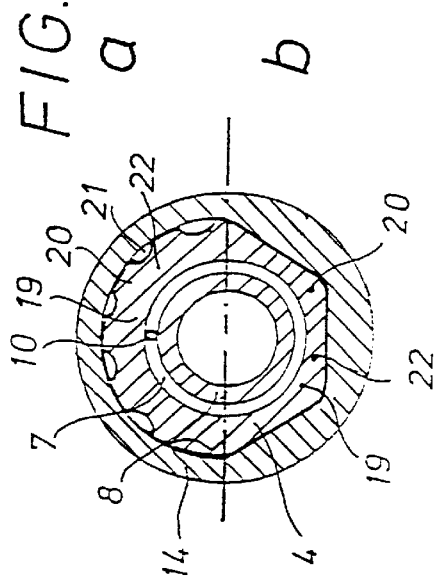
FIG. 4 is another embodiment of the expansion chuck of the invention in a schematic cross sectional diagram.

In the embodiments according to FIGS. 1 and 2, chucking face 13 is designed with a continuous cylindrical shape on outside wall 9, but in the variants according to FIG. 4 outside wall 19 has a different cross section with thicker and thinner areas 20, 22 which are distributed around the circumference at the same angular offset in an expedient manner and extent throughout the entire length of the effective chucking area. Areas 22 of reduced wall thickness are formed in the embodiment illustrated in the upper half of FIG. 4, labeled "a," by external longitudinal grooves 21 in outside wall 19.

As shown in the lower half of FIG. 4, labeled "b," chucking part 4 may have an outside hexagonal cross section, and bushing 14 may have an inside hexagonal cross section, thus also achieving a form-fitting twist locking effect in addition to an increased chucking effect in certain areas of the wall.

Figure 5:
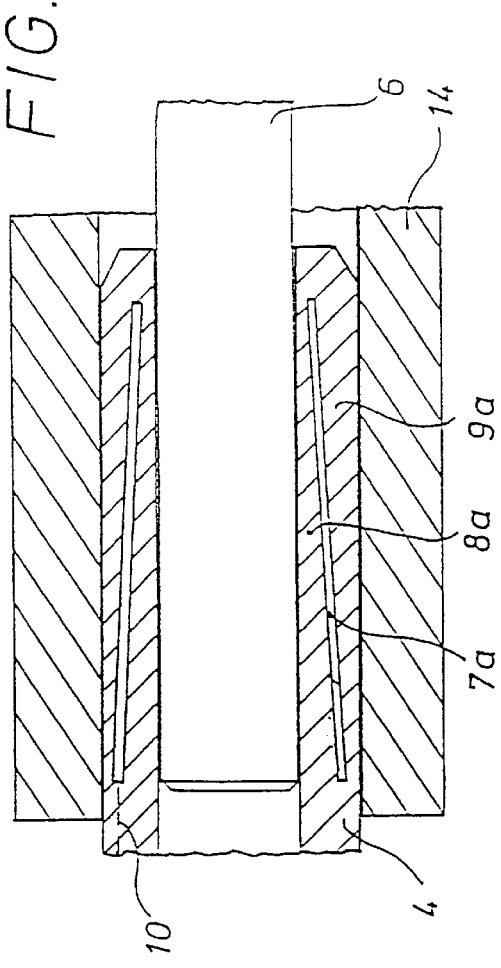
FIG. 5 is an alternative embodiment of the expansion chuck of the invention in a schematic axial diagram.
Figure 6:
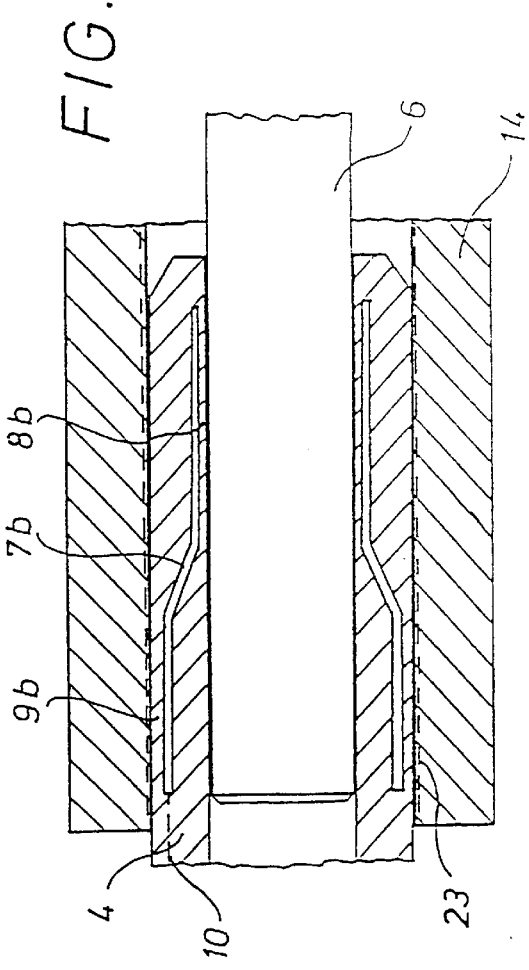
FIG. 6 is a further alternative embodiment of the expansion chuck of the invention in a schematic axial diagram.
Figure 3:
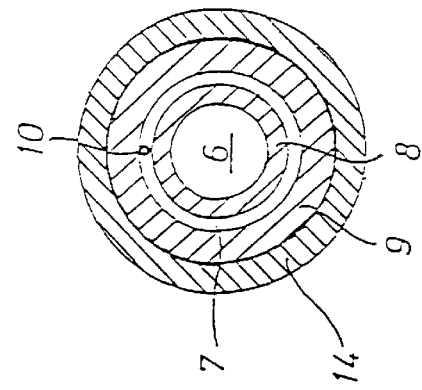
FIG. 3 is a sectional view of the expansion chuck of FIGS. 1 and 2, taken through cutting plane II—II.

With the embodiments illustrated in FIGS. 5 and 6, the chucking forces exerted by chucking part 4 on inside shaft 6 and on outside bushing 14 vary over the length of the chucking zone, which offers advantages in certain applications. The variant according to FIG. 5 has toroidal chamber 7a running conically in the interior of chucking part 4, causing a uniform variation in wall thickness of inside and outside bordering walls 8a and 9a. Due to the greater expansion of thinner dividing wall 8a in the right part of FIG. 5, greater tolerances with respect to shaft 6 can be bridged or tolerated in this section. The same thing is also true in the left part of FIG. 5 for outside wall 9a which is thinner here with respect to bushing 14.

In the embodiment according to FIG. 6, toroidal chamber 7b consists of three sections, namely a left sided section radially on the outside, a central conical section and a right sided section radially on the inside. Since the hydraulic pressure in toroidal chamber 7b is equal over its length, this results in different chucking effects accordingly in the two end sections owing to the different wall thicknesses of inside and outside walls 8b and 9b. In addition, with this embodiment the strength of the connection between chucking part 4 and bushing 14 is further increased by screwing the two parts together by means of thread 23. Due to the chucking action of thinner outside wall 9b, the usual thread play is eliminated and an additional securing effect is achieved. The middle section may also run radially.

This invention is not limited to the embodiments illustrated here and described above. For example, instead of beveling at tool 14, other accessory parts may also be used for certain suitable purposes. These could be for simultaneously performing additional machining operations, for measurement purposes, and for supplying coolant media to the working area of the main tool, among others. Furthermore the inside wall and the outside wall of the toroidal chamber may also have the same wall thickness, and the inside wall may also be consistently thicker than the outside wall, so that together with its internal chucking face it undergoes less expansion than the outside wall. It has been found that expansion adequate for chucking of the thicker wall can also be achieved with wall thickness ratios of more than 1 to 10. Furthermore the wall thickness of one or both walls may be varied gradually or incrementally in the longitudinal direction so as to result in toroidal zones of different expansion stresses.

In view of the above description, it is likely modifications and improvements will occur to those skilled in this technical field which are within the spirit and scope of the claims. Thus the invention is to be limited only by the accompanying claims and equivalents.

What is claimed is:

1. An expansion chuck for simultaneously chucking a tool shaft and a hollow tool part, the expansion chuck comprising:
    a solid chuck body which can be chucked in the working spindle of a machine tool, said chuck body having a central receptacle bore forming an inside peripheral wall in its chucking part to receive the tool shaft to be chucked, and an outside chucking face on an outside peripheral wall to hold the hollow tool part;
    an elongated toroidal chamber formed in the interior of said chucking part of said chuck body, said toroidal chamber being arranged coaxially with said receptacle bore and with said outside chucking face; and
    apparatus for generating a hydraulic internal pressure on said toroidal chamber so that said two peripheral walls undergo elastic deformation due to internal hydraulic pressure in said toroidal chamber acting radially toward the inside for chucking the tool shaft and radially toward the outside for chucking the hollow tool part.

2. The expansion chuck according to claim 1, and further comprising means on said hollow tool part to prevent twisting on said chuck body.

3. The expansion chuck according to claim 2, wherein said means to prevent twisting comprises at least one axially projecting tab on said hollow tool part as a twist locking device which engages in at least one recess in said chuck body with a predetermined longitudinal play.

4. The expansion chuck according to one of claims 1 through 3, wherein said hollow tool part is a beveling bushing having a forward, conically tapered end part on which is mounted at least one beveling blade.

5. The expansion chuck according to one of claims 1 through 3, wherein the axial position of said hollow tool part on said chucking part of said chuck body is adjustable.

6. The expansion chuck according to claim 5, and further comprising an adjusting ring for adjusting the axial position of said hollow tool part on said chuck body.

7. The expansion chuck according to one of claims 1 through 3, wherein the thickness of said outside wall is less than, equal to or greater than the thickness of said inside wall.

8. The expansion chuck according to one of claims 1 through 3, wherein said outside wall has areas of a reduced wall thickness running longitudinally and distributed around the circumference in alternation with thicker wall areas.

9. The expansion chuck according to one of claims 1 through 3, wherein the thicknesses of said outside wall and said inside wall vary over the length of said toroidal chamber.

10. The expansion chuck according to one of claims 1 through 3, wherein said bushing engaged on said chucking part is screwed to said chucking part in the chucking area.

11. The expansion chuck according to one of claims 1 through 3, wherein said apparatus for generating hydraulic pressure in said toroidal chamber has a manually operated control element including a piston, which is arranged in a cross hole in said chuck body so that it is manually adjustable and said piston generates a hydraulic pressure in a cylindrical chamber when adjusted, said pressure being transmitted to said toroidal chamber through a channel.

12. The expansion chuck according to one of claims 1 through 3, wherein said apparatus for generating hydraulic pressure in said toroidal chamber has an external pressure shaft connected by channels in said chuck body to said toroidal chamber.

\* \* \* \* \*